US010348894B2

(12) United States Patent
N et al.

(10) Patent No.: US 10,348,894 B2
(45) Date of Patent: Jul. 9, 2019

(54) CALL MOBILITY

(71) Applicant: GENESYS TELECOMMUNICATIONS LABORATORIES, INC., Daly City, CA (US)

(72) Inventors: Arun Sundar N, Karaikudi (IN); Vinod Natakala Madhavan, Chennai (IN); Vishwa Kumar K S, Chennai (IN)

(*) Notice: Subject to any disclaimer, the term of this patent is extended or adjusted under 35 U.S.C. 154(b) by 172 days.

(21) Appl. No.: 15/138,196

(22) Filed: Apr. 25, 2016

(65) Prior Publication Data
US 2017/0310823 A1 Oct. 26, 2017

(51) Int. Cl.
*H04M 3/00* (2006.01)
*H04M 3/51* (2006.01)
*H04M 3/42* (2006.01)

(52) U.S. Cl.
CPC ..... *H04M 3/5141* (2013.01); *H04M 3/42068* (2013.01); *H04M 3/5166* (2013.01)

(58) Field of Classification Search
CPC .. H04M 3/5175; H04M 3/523; H04M 3/5191; H04M 3/5183; H04M 3/5166; H04M 3/5232; H04M 3/5233
USPC .............. 379/265.01–265.02, 265.09, 265.11
See application file for complete search history.

(56) References Cited

U.S. PATENT DOCUMENTS

| | | | | |
|---|---|---|---|---|
| 6,970,553 B1* | 11/2005 | Gao | ........................ | H04L 51/04 379/265.09 |
| 7,092,509 B1* | 8/2006 | Mears | ................. | H04M 3/5191 379/265.02 |
| 8,658,542 B2* | 2/2014 | Smayling | .............. | H01L 21/027 257/E21.517 |
| 2007/0160187 A1 | 7/2007 | Kneipp et al. | | |
| 2009/0010408 A1* | 1/2009 | Altberg | .................. | G06Q 10/10 379/114.01 |
| 2010/0128720 A1 | 5/2010 | Goss | | |
| 2011/0299523 A1 | 12/2011 | Brown et al. | | |
| 2013/0282744 A1 | 10/2013 | Hartman et al. | | |
| 2014/0136195 A1* | 5/2014 | Abdossalami | .......... | G10L 15/26 704/235 |
| 2014/0161249 A1* | 6/2014 | Tolksdorf | .............. | H04M 3/523 379/266.1 |
| 2015/0078547 A1* | 3/2015 | Walls | .................. | H04M 3/5233 379/265.09 |
| 2016/0021194 A1* | 1/2016 | Prabhakar | ............. | H04L 67/143 709/204 |

(Continued)

OTHER PUBLICATIONS

International Search Report and Written Opinion for Application No. PCT/US2017/029194, dated Jul. 27, 2017, 15 pages.

*Primary Examiner* — Rasha S Al Aubaidi

(57) ABSTRACT

A method has steps for receiving at a call center implemented in a network, a first call from a caller using a first telephony-enabled device, connecting the received first call to an agent in the call center, creating and storing in a data repository at the call center a live call record associating an identity of the caller or a device of the caller with the agent to whom the first call is connected, receiving, while the first call is active, a second call from the same caller using a second telephony-enabled device, querying the data repository and discovering the live call record, routing the second call to the same agent to whom the first call is routed, and terminating the first call, but leaving the live call record in place.

20 Claims, 14 Drawing Sheets

(56) References Cited

U.S. PATENT DOCUMENTS

2016/0088155 A1 3/2016 Patel

* cited by examiner

CALL MOBILITY

BACKGROUND OF THE INVENTION

1. Field of the Invention

The present invention is in the technical field of telephony, and pertains more particularly to methods and apparatus for making calls mobile over different devices.

2. Description of Related Art

Call centers enabling customers of enterprises to access service from agents and network-connected data stores through organized, usually computerized systems are well-known in the art. In call centers in the current art it is typical for a customer to call in, often using a toll-free number to a Service Control Point (SCP), with the SCP forwarding the call to a call center, and through routing intelligence at the call center, to a live customer-care agent.

It is also generally well-known in the art, with the continued development of telephony capability across an increasingly broad variety of electronic devices, for a customer to place a call with a first device, to be connected to an agent, and then to discover that the device used for the call is not capable of some functionality that might be desired in the live call.

There is in the art at the time of the present application, generally no robust solution to this problem that might move the live call from the active device to another device that is capable of the further functionality wanted, without first dropping (terminating) the live call. And if the customer terminated the live call, and calls in to the same call center again, there is no sure way for the customer to have the second call routed to the same agent to whom the first call was routed, so the customer might pick up the interaction at the point that he or she realized more functionality is needed.

What is clearly needed, therefore, is apparatus and methods providing call mobility across different telephony-capable devices.

BRIEF SUMMARY OF THE INVENTION

In one embodiment of the present invention a method is provided, comprising receiving at a call center implemented in a network, a first call from a caller using a first telephony-enabled device, connecting the received first call to an agent in the call center, creating and storing in a data repository at the call center a live call record associating an identity of the caller or a device of the caller with the agent to whom the first call is connected, receiving, while the first call is active, a second call from the same caller using a second telephony-enabled device, querying the data repository and discovering the live call record, routing the second call to the same agent to whom the first call is routed, and terminating the first call, but leaving the live call record in place.

In one embodiment the method further comprises a step for deleting the live call record from the data repository upon termination of the second call. Also in one embodiment the identity of the caller is ANI, and ANI is enabled on the first and the second telephony-enabled devices. Also in an embodiment the call center maintains a user profile for individual ones of callers, and the user profile is queried on a first call for a caller ID, which is used to create the live call record. Also in one embodiment the method further comprises determining if a caller placing a second call, for which it is determined that a live call record is stored, intends to replace the first call for which the live call record was created, or wishes rather to conference the second call with the first call.

In one embodiment the determination of conference or replacement is made by interactive voice response interaction with the caller. Also in one embodiment the determination of conference or replacement is made according to data associated with the second call. In one embodiment the data comprises a toll-free number dialed by the caller for the second call. In one embodiment the method further comprises steps for terminating the first call or conferencing the first call according to the determination. And in one embodiment the method further comprises an application executing on both the first and the second telephony-enabled devices, the application enabling the caller in a first call to initiate a second call from the second telephony-enabled device to replace or conference with the first call, by tapping or swiping with the first telephony-enabled device, and wherein the interaction between the devices transfers data to initiate the second call and to identify the caller.

In another aspect of the invention an apparatus is provided, comprising a call center implemented in a network, the call center having work stations supporting agents, a data repository, and software executing on a processor of a server in the call center, the call center enabled by hardware and software to receive calls from the network and to connect the calls to individual ones of the agents, wherein a first call received from a caller using a first telephony-enabled device is connected to an agent, a live call record is created comprising an ID for the caller and the agent, and wherein, upon receiving a second call from the same caller using a second telephony-enabled device, and discovering the live call record for the first call, the second call is routed to the same agent with whom the first call is live, the first call is terminated and the live call record is left in place.

In one embodiment of the apparatus, upon termination of the second call the live call record is deleted. Also in one embodiment the ID of the caller is ANI, and ANI is enabled on the first and the second telephony-enabled devices. In one embodiment the call center maintains a user profile for individual ones of callers, and the user profile is queried on a first call for a caller ID, which is used to create the live call record. And in one embodiment the call center determines if a caller placing a second call, for which it is determined that a live call record is stored, intends to replace the first call for which the live call record was created, or wishes rather to conference the second call with the first call.

In one embodiment the determination of conference or replacement is made by interactive voice response interaction with the caller. Also in one embodiment the determination of conference or replacement is made according to data associated with the second call. In one embodiment the data comprises a toll-free number dialed by the caller for the second call. In one embodiment the first call is terminated or caused to conference with the second according to the determination. And in one embodiment the apparatus further comprises an application executing on both the first and the second telephony-enabled devices, the application enabling the caller in a first call to initiate a second call from the second telephony-enabled device to replace or conference with the first call, by tapping or swiping with the first telephony-enabled device, and wherein the interaction between the devices transfers data to initiate the second call and to identify the caller.

According to one embodiment, the present invention is also directed to a method for managing telephony calls for a customer contact center. The method includes identifying, by a processor, a first call from a first caller made via a first telephony-enabled device. The processor transmits a signal for connecting the first call to an agent device in the customer contact center. The processor further creates and stores a call record for the first call. According to one embodiment, the call record associates an identity of the caller or a device of the caller with the agent to whom the first call is connected. The processor further identifies, while the first call is active, a second call from the caller via a second telephony-enabled device. The processor retrieves the call record in response to identifying the second call, and transmits a signal for routing the second call to the agent in response to data retrieved from the call record. The processor transmits a signal for terminating the first call without deleting the call record, and proceeds to store data related to the second call, in the call record.

DETAILED DESCRIPTION OF THE INVENTION

Figure 1:
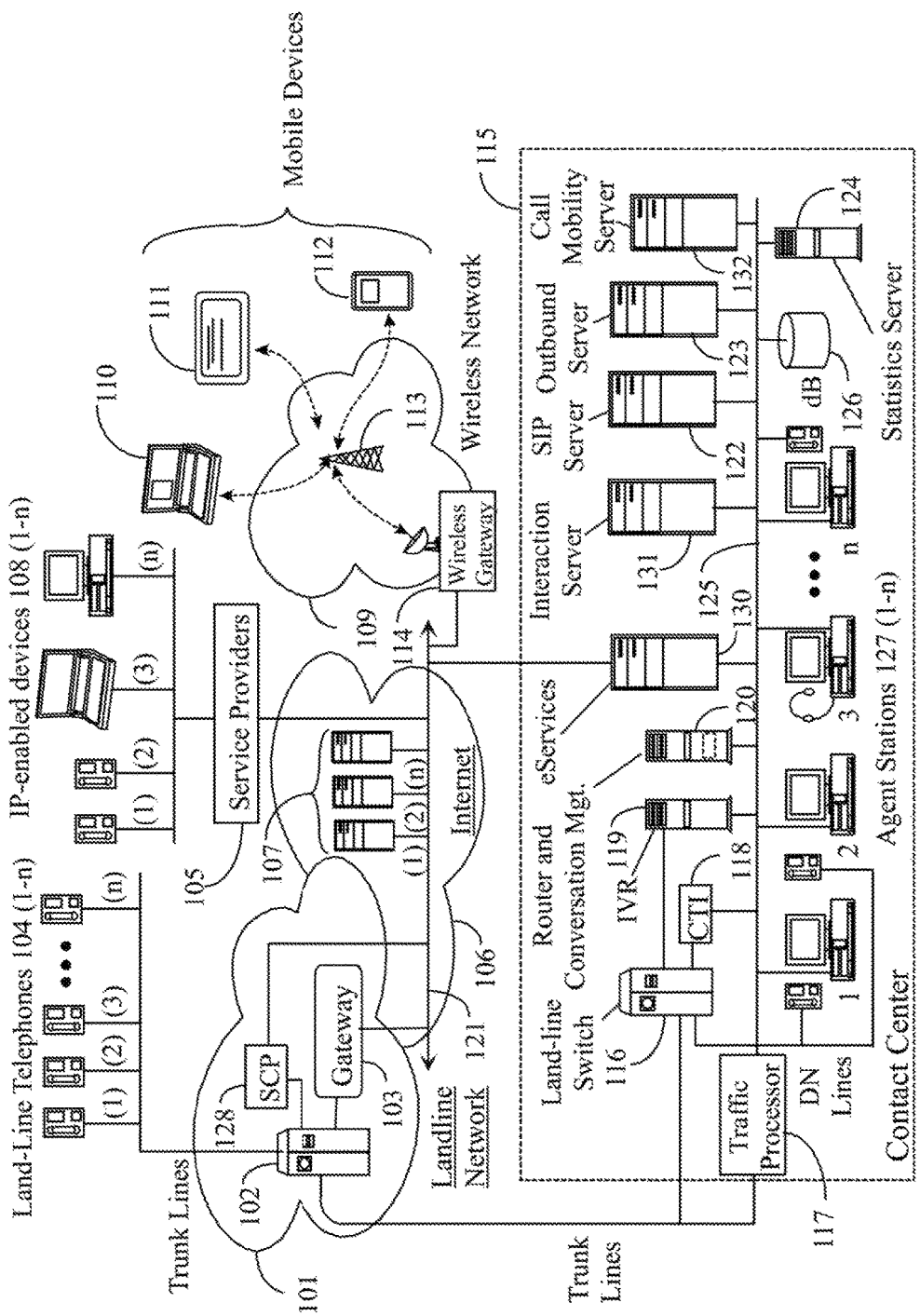
FIG. 1 is an architectural diagram illustrating a communication network, including a contact center and an optional call mobility server, in an embodiment of the present invention.

FIG. 1 is a diagram illustrating a contact center 115 and a plurality of networks with interconnections whereby customers and remote agents may interact with agents and interactive functionality at the contact center. Contact center 115 may be hosted by one enterprise or by more than one enterprise, and one enterprise may employ more than one contact center. Customers and agents may interact with contact center 115 through communication appliances such as land-line telephones 104 (1-n), IP-enabled devices 108 (1-n), or through mobile appliances 110, 111 or 112. In some circumstances interaction may be limited to voice, but in other circumstances interaction may include text interaction, such as, for example, email, messaging services chat, video interaction, data services, and so on.

Persons interacting through land-line telephones 104 may connect firstly over trunk lines as shown to a network switch 102. Switch 102 may interact with hardware and software of a Service Control Point (SCP) 128, which may execute intelligent operations to determine to connect an incoming call to different ones of available contact centers or to route an incoming call directly to an agent in a contact center or to an agent operating as a remote agent outside a contact center premises. Incoming calls in some circumstances may also be routed through a gateway 103 into the well-known Internet network 106 as packet-switched calls. The interconnections in the Internet are represented by backbone 121. In this circumstance such a call may be further processed as a packet-switched IP call. Equipment providing SCP services may also connect to the Internet and may allow SCP functionality to be integrated with Internet-connected servers and intelligence at contact centers.

A call from a land-line telephone 104 connecting to switch 102 may be routed to contact center 115 via trunk lines as shown to either a land-line switch 116 in contact center 115 or to a traffic processor 117. A contact center 115 may operate with just one of the land-line switch or the traffic processor, but in some circumstances may employ both incoming paths. Traffic processor 117 may provide Session Border Control (SBC) functionality, may operate as a Media Gateway, or as a SoftSwitch.

Persons interacting through IP-enabled devices 108 (1-n) may interact through the Internet network via backbone 121, enabled by a variety of service providers 105 which operate to provide Internet service for such devices. Devices 108(1) and 108(2) may be IP-enabled telephones, operating under a protocol such as Session Initiation Protocol (SIP). Appliance 108(3) is illustrated as a lap-top computer, which may be enabled by software for voice communication over packet networks such as the Internet, and may also interact in many other ways, depending on installed and operable software, such as Skype™. Similarly, appliance 108(n) illustrated as a desktop computer, may interact over the Internet in much the same manner as laptop appliance 108(3).

Many IP-enabled devices provide capability for users to interact both in voice interactions and text interactions, such as email and text messaging services and protocols. Internet 106 may comprise a substantial variety of Internet-connected servers 107 and IP-enabled devices with Internet access may connect to individual ones of such servers to access services provided. Servers 107 in the Internet may comprise email servers, text messaging servers, social networking servers, Voice over IP servers (VoIP), and many more, many of which users may leverage in interaction with a contact center such as contact center 115.

Another arrangement by which users and agents may interact with contact centers is through mobile devices, illustrated in FIG. 1 by devices 110, 11 and 112. Such devices may include, but are not limited to laptop computers, Pad devices and smart telephones. Such devices are not limited by a land-line connection or by a hard-wired Internet connection as shown for telephones 104 or IP-enabled devices 108, and may be used by customers and agents from changing geographic locations and while in motion. Devices 110, 111 and 112 are illustrated in FIG. 1 as connecting through a wireless network 109, which may occur through individual ones of cell towers 113 associated with base stations having gateways such as gateway 114 illustrated, the gateways connected to Internet backbone 121.

In some circumstances mobile devices, such as devices 110, 111 and 112 may connect to supplemental equipment operable in a moving vehicle. For example, cellular smartphones may be enabled for near-field communication such as Bluetooth™, and may be paired with equipment in an automobile, which may in turn connect to the Internet network through satellite equipment and services, such as OnStar™. Wireless communication may be provided as well in aircraft, which may provide an on-board base station, which may connect wirelessly to the Internet through either a series of ground stations over which an aircraft may pass in flight, or through one or more satellites.

Regardless of the variety of ways that Internet access may be attained by mobile devices, users of these devices may leverage Internet-connected servers for a great variety of services, or may connect through the Internet more directly to a contact center such as contact center 115, where users may interact as customers or as agents of the contact center.

Contact center 115, as described above, may represent one of a plurality of federated contact centers, a single center hosted by a single enterprise, a single contact center operating on behalf of a plurality of host enterprises, or any one of a variety of other arrangements. Architecture of an individual contact center 115 may also vary considerably, and not all variations may be illustrated in a single diagram such as FIG. 1, which is exemplary. The architecture and interconnectivity illustrated in FIG. 1 is exemplary.

Equipment in a contact center such as contact center 115 may be interconnected through a local area network (LAN) 125. Land-line calls may arrive at a land-line switch 116 over trunk lines as shown from land-line network 101. There are a wide variety of land-line switches such as switch 116, and not all have the same functionality. Functionality may be enhanced by use of computer-telephony integration (CTI), which may be provided by a CTI server 118, which may note arriving calls, and may interact with other service units connected to LAN 125 to route the calls to agents connected to LAN 125, or in some circumstances may route calls to individual ones of remote agents who may be using any of land-line telephones 104, IP-enabled devices 108 or mobile devices represented by devices 110, 111 or 112. Calls may be queued in any one of a variety of ways before connection to an agent, either locally-based or remote from the contact center, depending on circumstances.

Incoming land-line calls to switch 116 may also be connected to an IVR server 119, which may serve to ascertain purpose of the caller and other information useful in further routing of the call to final connection. A universal router and/or conversation manager server 120 may be leveraged for routing intelligence, of which there may be a great variety, and for association of the instant call with previous calls or future calls that might be made. Call mobility intelligence, and server execution of same, is described in additional detail in descriptions below.

Land-line calls thusly treated may be connected to agents at agent stations 127(1) or 127(2), each of which is shown as comprising a land-line telephone connected to switch 116 by destination number (DN) lines. Such calls may also be connected to remote agents using land-line telephones back through the land-line network. Such remote agents may also have computing appliances connected to call center 115 for interaction with agent services such as scripting through an agent desktop application, also used by agents at agent stations 127.

Incoming calls from land-line network 101 may alternatively be connected in contact center 115 through traffic processor 117, described briefly above, to LAN 125. In some circumstances traffic processor 117 may convert incoming calls to SIP protocol, and such calls may be further managed by SIP server 122.

Incoming calls from IP-enabled devices 108 or from mobile devices 110, 111 or 112, and a wide variety of text-based electronic communications may come to contact center 115 through the Internet, arriving in the contact center at an eServices connector 130. eServices connector 130 may provide protective functions, such as a firewall may provide in other architecture, and may serve to direct incoming transactions to appropriate service servers. For example, SIP calls may be directed to SIP server 122, and text-based transactions may be directed to an Interaction server 131, which may manage email, chat sessions, Short Message Service (SMS) transactions, co-browsing sessions, and more. Interaction server 131 may leverage services of other servers in the contact center, and available remotely as well.

Agent station 127(3) is illustrated as having a connected headset from a computing device, which may execute telephony software to interact with packet-switched calls. Agent station 127(n) is illustrated as having an IP-enabled telephone connected to LAN 125, through which an agent at that station may connect to packet-switched calls. Every agent station may have a computerized appliance executing software to enable the using agent to transact by voice, email, chat, instant messaging, and any other known communication process.

A statistics server (referred herein as Statserver) 124 is illustrated in contact center 115, connected to LAN 125, and may provide a variety of services to agents operating in the contact center, and in some circumstances to customers of the contact center. Statistics may be used in contact center management to vary functionality in routing intelligence, load management, and in many other ways. A mass storage device 126 may be provided to archive data and to provide temporary storage for many of the activities in contact center 115. An outbound server 123 is illustrated and may be used to manage outbound campaigns in the contact center, wherein calls may be made to destinations from a campaign list, and answered calls may be connected directly or may be queued to be connected to agents involved in the outbound campaigns.

In one embodiment of the invention, in addition to other service servers shown in call center 115, there may additionally be a call mobility server 133 shown in FIG. 1, connected to LAN 125. The functions of call mobility server 132 in implementations described as examples below, are unique in call center technology, and particular to aspects of the present invention.

As described above, contact center 115, and the architecture and connectivity of the networks through which transaction is accomplished between customers and agents is exemplary, and there are a variety of ways that similar functionality might be attained with somewhat different architecture.

In general terms, call mobility according to one embodiment of the invention is that a person calling in to a call center, such as call center 115, will make that call from one device. The caller may, however, have access to more than the one device for placing calls and transacting business. It is well known that devices of different sorts may have different capabilities. A caller may make a call using a land-line telephone, for example, and be connected to an agent in the call center. During the live call, the caller or the agent, or both, may find that to better transact the business at hand, a capability may be desired that the land-line telephone cannot provide. The agent may want to display a graphic to the caller, as one small example, and the land-line telephone has no display.

A current solution to this problem is to terminate the live call, and go to a device with a display, perhaps a laptop computer, and use software-provided ability of the laptop computer to place a second call. Reconnection to the same agent, however, is problematical in this case, as agents are expected to handle calls efficiently and sequentially, and the original agent may not be available for the second call. Even if the agent is available for the second call, there exists no practical mechanism to efficiently route the second call to the same agent. There is an option to use a known "last agent" operation in routing strategy, but this may not be practical because the last agent may be busy with another call, and the customer would have to wait in queue to be routed to the last agent. Accordingly, embodiments of the present invention allow a second call to be connected in such a circumstance before the live first call is terminated, for providing context and continuity from the first call to the second call.

Figure 2:
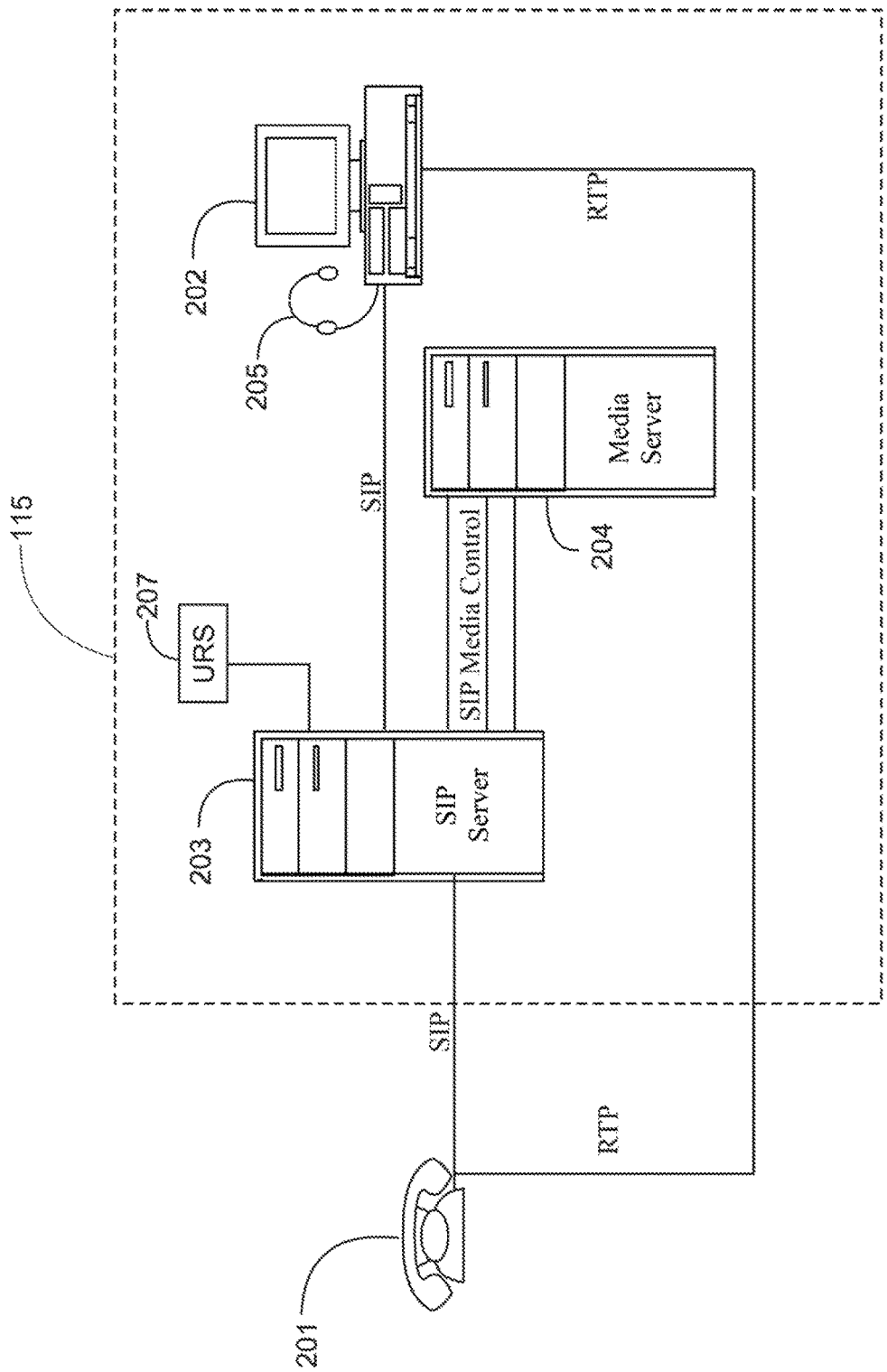
FIG. 2 is a simplified diagram from FIG. 1 illustrating a typical architecture and process in connecting a call.

FIG. 2 is a simplified diagram from FIG. 1, illustrating a first live call from a caller using a land-line telephone 201 connected to an agent in call center 115. The agent in this implementation operates at a workstation having a desktop computer 202 having software enabling telephony function using headset 205. It should be understood that the caller using land-line telephone 201 may have made the call using any one of a variety of telephony-enabled devices, and the agent using computer 202 may be using any one of a variety of telephony-enabled devices. The agent may, in some implementations, be a remote agent operating at a premise separate and perhaps far-removed from call center 115.

Call setup in this example is by a SIP request from telephone 201 to SIP server 203. SIP server 203 communicates with the device of an agent selected to take the call, in this example computer 202. In this example SIP server 203 is connected to and interacts with a routing server referred to as a Universal Routing Server (URS) 207, having functionality to do intelligent routing, and to determine a best agent for the incoming call.

The skilled person will understand that diagram FIG. 2 is substantially simplified, and that a caller using land-line telephone 201 may have called a toll-free number, where the call is processed by a Service Control Point (SCP), and then directed to call center 115. The skilled person will also understand that SIP signals are not voice, text or video, but control signals, and that the actual media interaction for a call is separate from SIP by Real-Time Transfer Protocol (RTP), used to represent all of the protocols for video, text and audio. According to one embodiment, an actual conversation does not pass through the SIP server. The SIP signals and RTP signals are typically shared through the Local Area Network of a call center as may be followed in FIG. 1.

Figure 3:
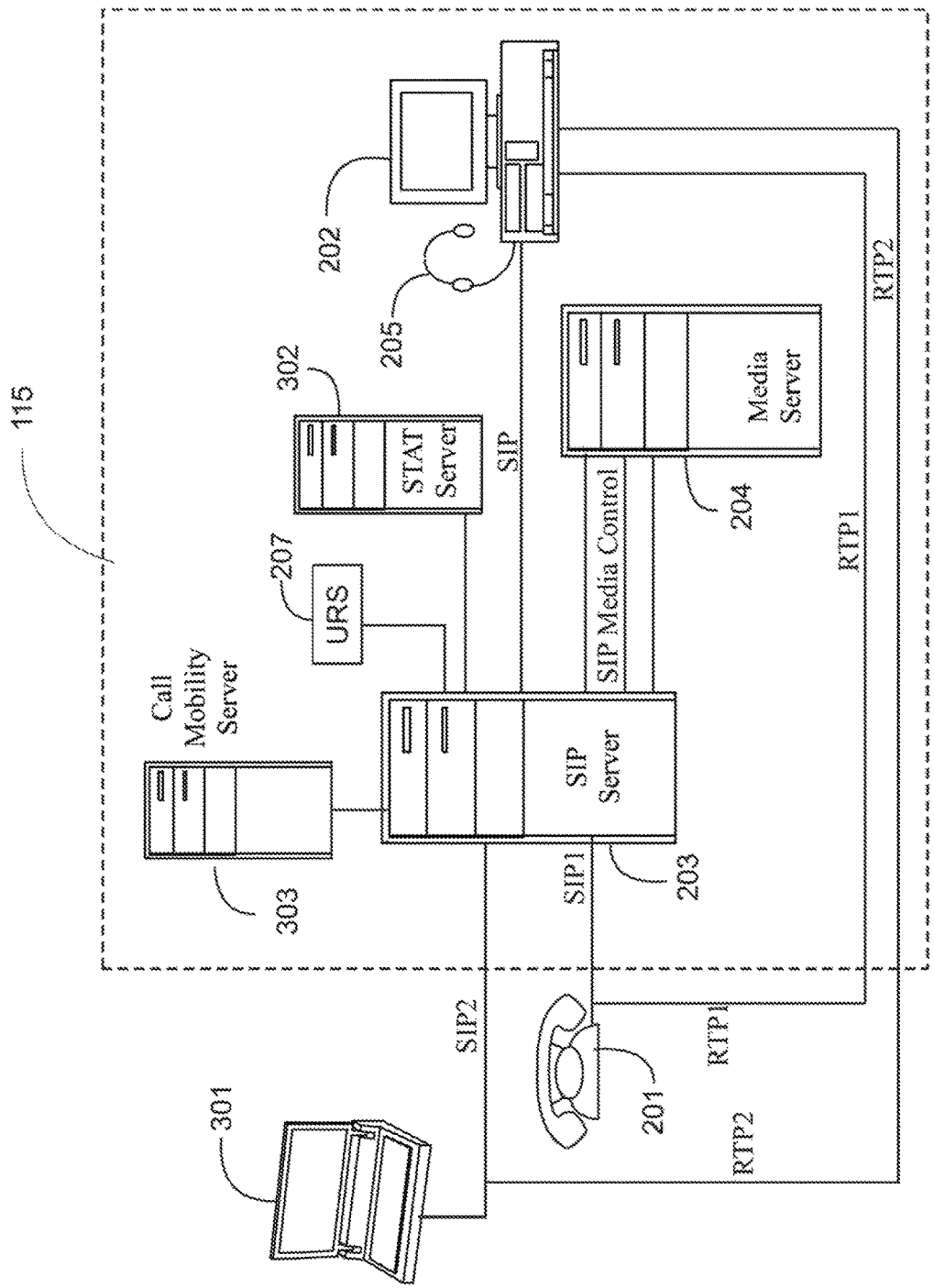
FIG. 3 is a diagram illustrating the architecture and process, including an optional call mobility server as a client of a SIP server, in an embodiment of the invention.

FIG. 3 is a diagram illustrating the caller and agent involved in the live call of FIG. 2, and a second telephony-enabled device 301, in this case a laptop computer, available to the original caller. In this example, in progress of the first live call between the caller using device 201 and the agent at device 202, one or the other, or both, decided that there is a good reason to move the call to a different device, in this example, on the caller's side. An example of a reason for such a move might be that the agent wants to share some information with the caller in a way that the land-line telephone cannot handle, such as, for example, a graphic display. Another motivation may of course be considerably different than this example. For example, the caller may have started with a fixed device like a desktop computer, and may be getting nervous in the conversation, and may want to pace back and forth while having the conversation with the agent. This may be a reason for the caller to provide a signal to move the call to a mobile device such as, for example, the caller's cellular telephone.

In the second example described above, the caller, using land-line telephone 201, is engaged with the agent in a live call. Now the caller moves to device 301, her laptop computer, without terminating the first live call, and places a second call to the same contact center. The original caller now calls into the same or a different toll-free number. There is good reason in some circumstance for the caller to use a different toll-free number, which will be described in more detail below, but, in one embodiment, the different toll-free number still connects the caller to the same call center. The SIP request is shown in FIG. 3 from the caller at her laptop computer 301 to the SIP server as SIP 2.

FIG. 3 illustrates a Statserver analogous to Statserver 124 of FIG. 1, as well as an optional call mobility server 303 as a client of SIP server 203. In implementation of call-mobility according to various embodiments of the present invention, the first call is left live while a second call is completed to the same agent connected in the first call. To accomplish this according to one embodiment of the invention, the intelligence in the call center determines that the caller making the second call is a caller already engaged with an agent in a live call from a different device than the device the caller is using for the second call.

In one embodiment of the invention, to provide for call mobility, for each call that is connected to an agent in the call center, establishing a live call between the caller and the agent, a live call record is created, which in one instance may be a call object in SIP server. According to one embodiment of the invention, the live call record, wherever it is maintained and accessed, identifies the agent as well as the caller identity in order to allow the call mobility intelligence to route the second call to the same agent while the first call is still live. This functionality is provided by, for example, software intelligence, which may, in different embodiments, execute on one or a combination of different servers. Of course, the intelligence may also be implemented in hardware, firmware, or a combination of hardware, firmware, and software. In one implementation, the intelligence may be provided by Universal Routing Server (URS) 207 as a client of SIP server 203. In another implementation the intelligence may be provided by optional call mobility server 303 as a client of SIP server 203. In other possible implementations tasks may be shared between URS 207 and Server 303, or even in concert with intelligence elsewhere in the call center system. There are a number of alternative implementations. For example, with a call mobility server as an add-on to URS there are several options:

(1) from a routing strategy the system may store temporarily (e.g. 5 mins) data in URS memory, and on receipt of the second call, the strategy may check for such stored info; or
(2) the system might leverage an available URS http plug-in option where an attached service may be performing this function. When a routing strategy is executed on URS it may check URS memory (option 1) or query the connected http service (option 2) for routing instructions, passing data of the new call. If there is already a call with the same customer, and the new call has a flag indicating call mobility, then the call mobility server may return the target information to URS, along with scenario instructions. The call mobility server may subscribe to Statserver in order to track call status of an agent being subject to call mobility, e.g. if agent is still busy with first call.

In one implementation, when a new call arrives at SIP server 203, the SIP server may send an event to subscribed clients, which may be URS 207, call mobility server 303, or both, if both are present in the physical implementation. Assuming the URS is extended to provide the call mobility solution described herein, the URS queries the Statserver 302 for existence of a related live call, and for appropriate targets for completing the call. The intelligence, whether executed in URS 207 or call mobility server 303, instructs the SIP server where to route the call. The actual routing steps are accomplished outside the SIP server. In one implementation, once a new call arrives, the SIP server sends a message to URS requesting routing instructions. URS queries Statserver for list of available targets, such as "all not busy agents with skill X." Then, URS picks one of them and instructs SIP server to connect the call to the selected agent. Upon completion, both URS and Statserver receive an event from SIP server, and Statserver flags the given agent as busy until the call is finished—which is also indicated through an event message from SIP server. According to one embodiment, when making a routing decision, URS can ignore/overwrite the target information received from StatServer, e.g. URS can decide to route a second call to an agent who is already busy with first call.

The unique identifier for the caller may be any one of, or more than one of, a customer registration number, an account number in the case of call centers hosted by finance institutions and others, the caller ANI, or another unique identifier. When device 2 is communicating over the Internet, the user may be prompted to enter the ANI with which the call is already active. In case device 2 is another phone device, the user may also be prompted to get the first phone device ANI for call mobility uses.

The identifier in one embodiment could be as simple as a number having just a few digits (easy to remember), assigned automatically at the beginning of the live call, and shared with both the agent and the caller.

According to one embodiment, in order to accomplish live call mobility, an assumption is made that a SIP request from a second call (referred as SIP2), includes the unique identifier for the original caller, which in one example is ANI, or at least that a unique identifier is available to the call mobility intelligence. The token (unique identifier) may be entered in IVR interaction, which attaches the token as user data to the call and URS can pick it up. In another embodiment, the user may send an SMS with the token, and the contact center will then call the user's smartphone from which the SMS was sent.

SIP server 203, receiving SIP2, notifies call mobility client, which may be URS or call mobility server, of the new call, and the call mobility server inquires of Statserver 302, or wherever else the intelligence of a live call may be maintained, whether there is a record for a live call record, including the ANI, or other caller ID, for the caller placing the call resulting in the new call request, SIP2. Discovering such a record in this case, the Statserver knows that there is indeed a live call between this caller and an agent, and the record reveals the agent ID for the original call. Now the SIP server is instructed by the call mobility intelligence to route the second call to the same agent. Upon establishing the second call, the call mobility intelligence instructs the SIP server to terminate the first call.

In one embodiment of the invention, the call mobility intelligence may query the Statserver for a live call record (also referred to as a call object) for the calling party in every instance. In another embodiment, the caller moving to a second device may be aware that there is a different toll-free number to call to accomplish moving the live call to the second device, and in this embodiment, the SIP server queries the Statserver for live call only in response to a call arriving on the alternate toll-free number. There are several ways that callers may be aware that there is a second toll-free number, and its purpose. In yet another embodiment, where callers are first engaged with an IVR as a requirement for routing, the IVR may be programmed to query the caller as to whether the call is to replace a first call, and also, in some embodiments, as to whether the caller wishes to replace the first live call with the second, or whether the caller prefers to conference the two calls, in which case the media server creates a conference between the two caller devices and the agent's device.

Figure 4:
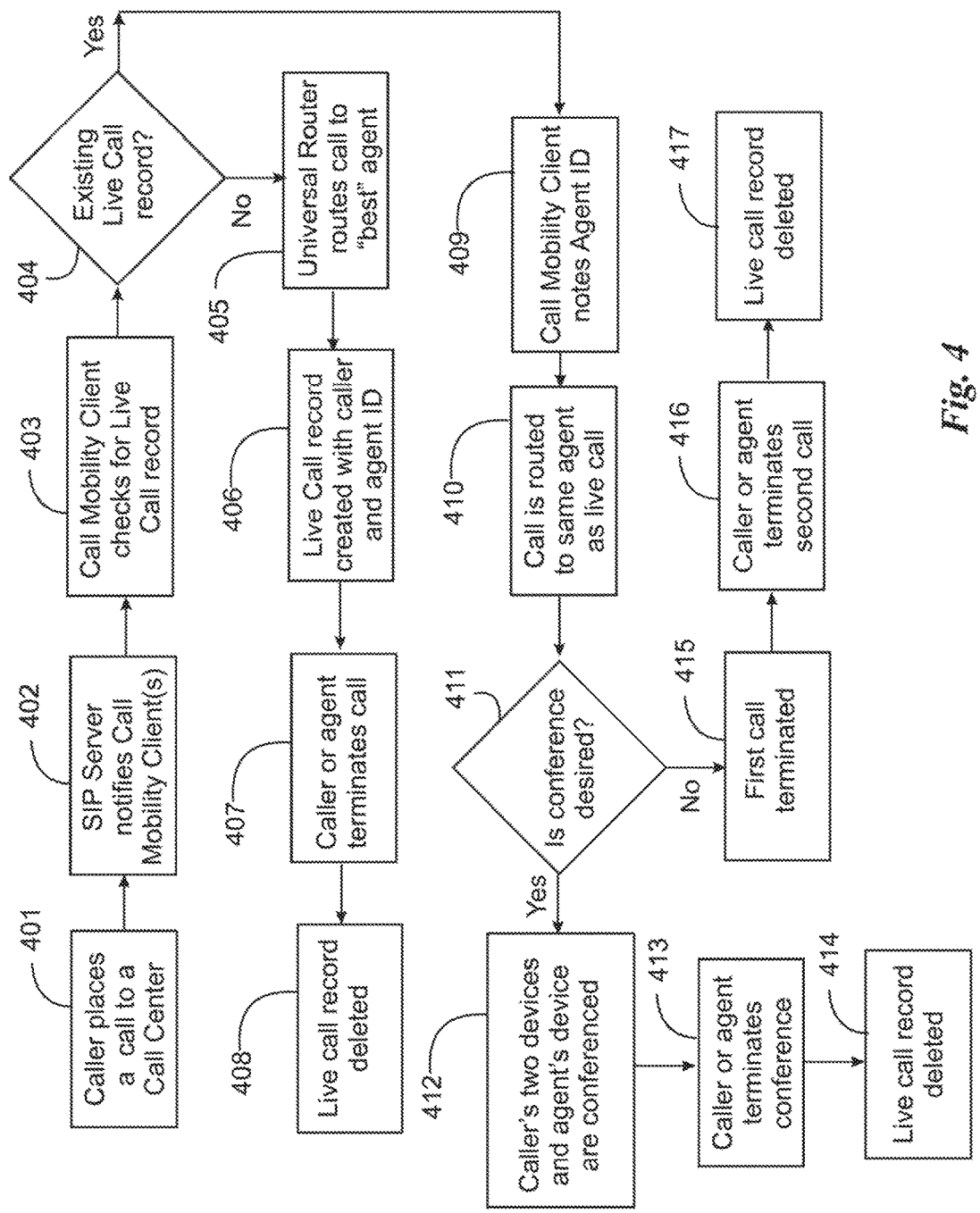
FIG. 4 is a flow diagram illustrating a process in an embodiment of the invention.

FIG. 4 is a flow diagram for processing a call to a contact center, whether or not the call is a first call, or a second call intended to replace or conference with the first call. At act 401 a caller places a call to a call center. At act 402 the SIP server, receiving the SIP request for the call, notifies call mobility clients of the call, including call data associated with the call. The call mobility clients may be the Universal Router or the call mobility server in different embodiments. The call data should identify the caller, such as by ANI or some other caller ID, which might be an account number, or any other unique ID agreed upon for call mobility.

At act 403 the call mobility client checks the Statserver for a live call record. At act 404 it is determined whether a live call record exists. If NO, it is established that the incoming call is a first call, and there is no existing live call with this caller and an agent. Control goes to act 405, and the call is routed to a "best" agent. This may involve routing intelligence and strategy executed by the URS. Once the agent for the call is determined and the call is connected to the agent, at act 406 a live call record is created and stored in the Statserver for the connected live call. The live call record stays active as long as the call stays active. At act 407 the live call is terminated by either the caller of the agent, and at act 408 the live call record is deleted at the Statserver.

If at act 404 it is determined that there is an existing live call record (Yes), control goes to act 409, and the call mobility client notes the agent ID in the live call record. Using the agent ID in act 410 the call is routed to the same agent as in the existing live call, by the call mobility client instructing the SIP server. At act 411 it is determined whether or not a conference is desired. This may be determined by the call having come in to a specific toll-free number, through query in an IVR in routing strategy, or by direct query by the agent once the second call is established.

If YES at act 411, at act 412 the caller's two devices and the agent's device are conferenced with the conference established and maintained through a media server. At act 413 the caller or the agent terminates the conference, and at act 414 the live call record is deleted at the Statserver.

If at act 411 it is determined that a conference is not desired, then at act 415 the first of the two calls is terminated. In this regard, the Statserver refrains from deleting the live call record although the first of the two calls is terminated. The live call record is used to store details related to the second call, such as, for example, the called number, calling number, wait time, IVR interaction data, and the like.

At act 416 the caller or the agent terminates the second call, and at act 417 the live call record is deleted at the Statserver.

Again it should be noted that ANI is just one identification that may be used in establishing live call records and in noting second calls against live calls. ID may be any one of a variety of other data points, as discussed above. ANI has an advantage in that it may be a part of call data in many circumstances without manual intervention by a caller, an agent or by IVR. Another embodiment of the invention may involve a situation wherein the enterprise hosting the contact center maintains client profiles, and the client profiles might include identification of various communication devices that a user may rely upon. Phone numbers and IP addresses of such devices may be leveraged as caller ID for live call records. In some cases the host enterprise may, at time of registration, provide the client with a unique ID to be used for call mobility, and the client may be informed to use this ID when, and if, placing a second call to replace a first call to an agent. As one example, in such a case all calls may go through IVR with a standard query "Is this a replacement for a live call? If so, please enter or speak your call mobility code." There are indeed many possibilities.

Figure 5:
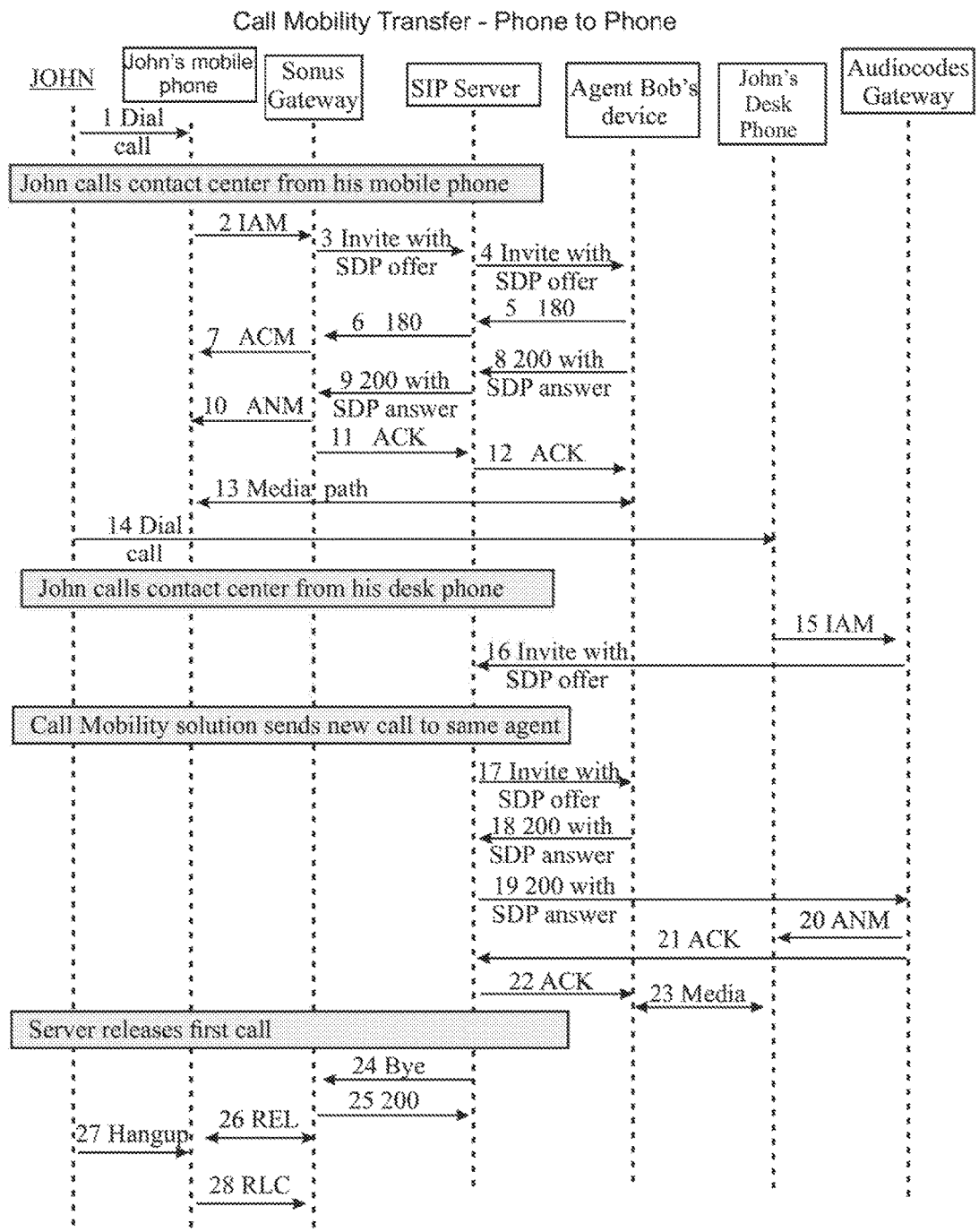
FIG. 5 is a sequence diagram illustrating call mobility in an embodiment of the present invention.

FIG. 5 is a sequence diagram for one example of placing and replacing a call using call mobility in the circumstance of a user placing a first call from a mobile telephone to a contact center, being connected to an agent, and then moving to a desk telephone to place a second call to the same agent. The sequential steps are numbered 1 through 28 in FIG. 5, and begin with a caller, John, dialing a call (1) from his mobile phone. In this example calls to a toll-free number are handled by a SONUS™ session border controller (Sonus Gateway), and internal operations are according to hardware architecture in FIG. 1, but this is not a limiting factor in the invention, just an example. The operations from the first call dialed to a media path being established to Agent Bob are numbered consecutively 2 through 13.

Not shown in FIG. 5, because the sequence diagram shows only the telephony steps, is the fact of the contact center system establishing a live call record in a Statserver associating John's ID with agent Bob's device in a live call. In one special case this may be ANI.

At some point in interaction with agent Bob, John decides, for whatever reason, to move to his desk telephone. It may be, for example, that his mobile phone has limited bandwidth, or the battery may be dying. So at (14) John calls back to the call center, using his desk telephone. Steps 15 through 23 follow the call sequence, and in this process the contact center solution, operating as described above, checks the Statserver for a live call record with John's ID, in this example ANI. Finding that John is indeed, at the time of placing the call from his desk telephone, is engaged in a live call with agent Bob, the call mobility solution at the contact center routes the call to agent Bob, the same agent with which John is involved in a live call at the time of making the second call.

Figure 6A:
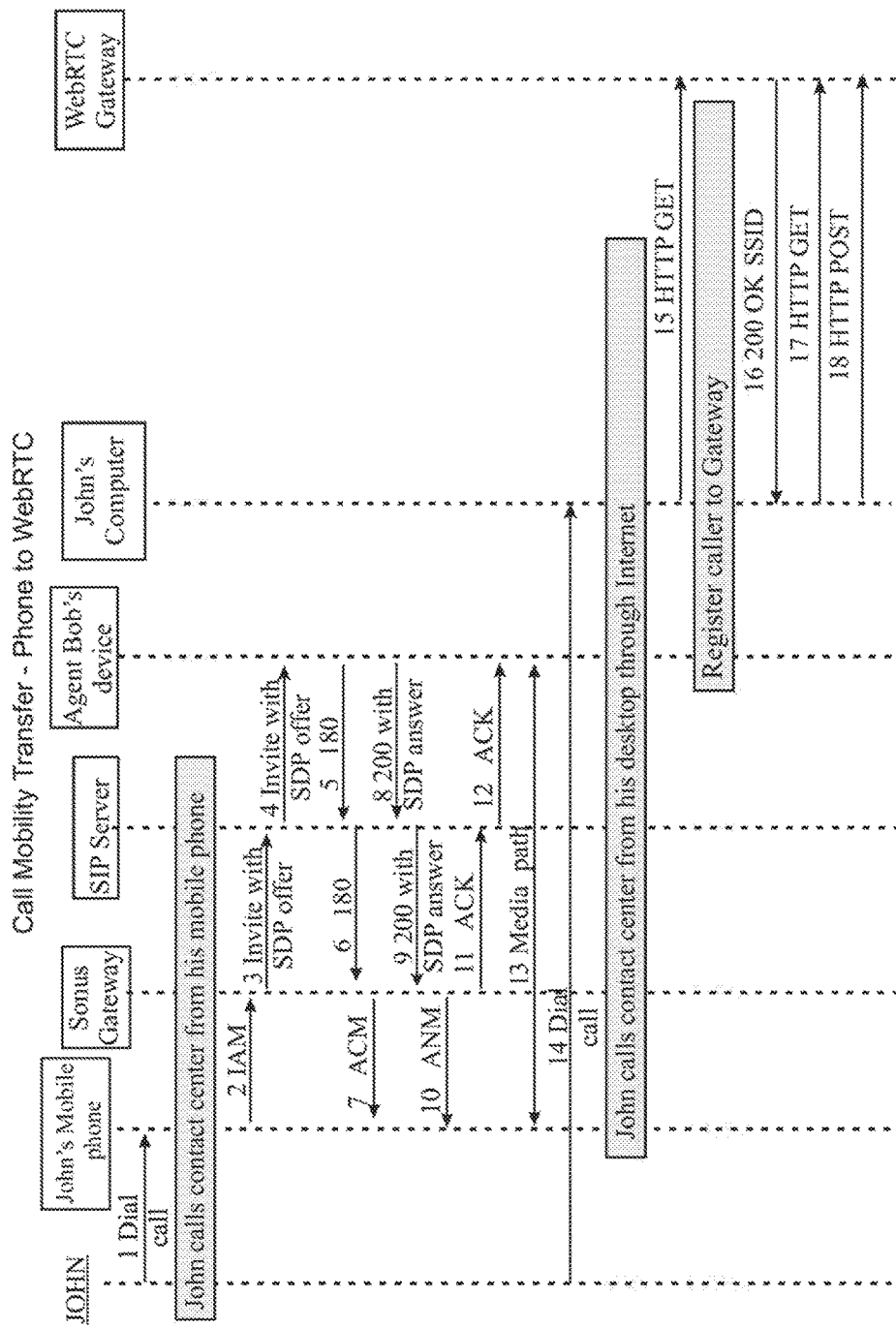
FIGS. 6a and 6b together illustrate call mobility in another embodiment of the invention.
Figure 6B:
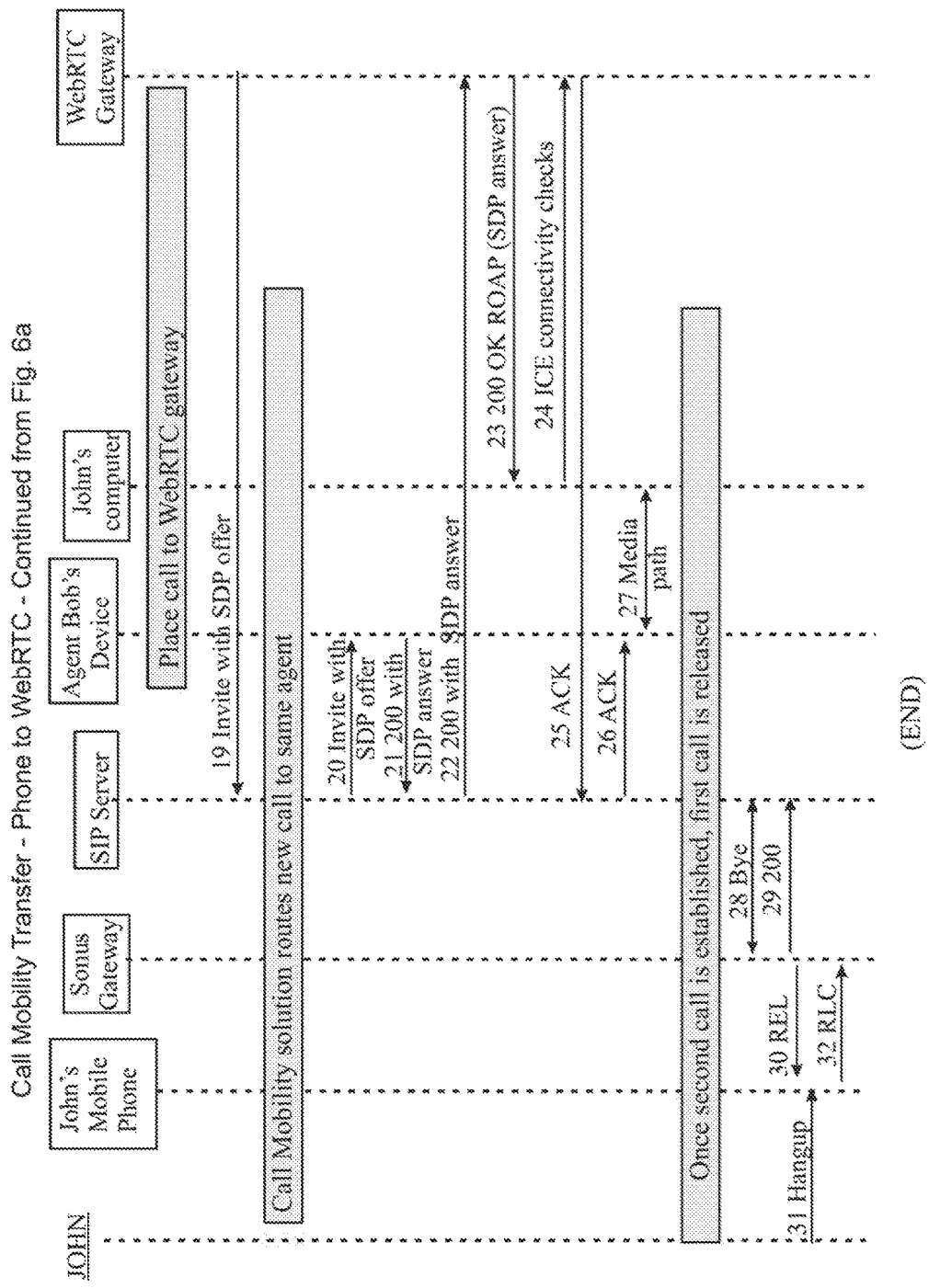

In this example, once the second call is connected to the same agent as the first call, the first call is terminated. However, the process refrains from deleting the live call record. These operations are 24 through 28. The second call may be a complete end-to-end second call, with different call party legs at both sides, or it may be a conference where the agent has only one call party leg. Both are possible if the agent's phone supports multiple concurrent calls FIGS. 6a and 6b illustrate the telephony operations in much the same architecture as for FIG. 5, for a call replacement in the circumstance of a first call from John's mobile phone and a second call from John's desktop computer through the Internet. In this circumstance a WebRTC gateway is involved. WebRTC refers to web real-time communication, and is an API definition drafted by the World Wide Web Consortium (W3C) and IETF that supports browser-to-browser applications for voice calling, video chat, and P2P file sharing without the need of either internal or external plugins.

The operations 1 through 14 in FIG. 6a are the same as for the circumstance of FIG. 5. The second call, however, is placed by John with his desktop computer, through the Internet, and is handled by the WebRTC gateway, shown by steps 15 through 19.

Continuing on FIG. 6b, step 19 is shown as passing the request to the SIP server from the gateway. Steps 20 through 27 then, are the steps for routing the second call to the same agent as the first call, the contact center solution having found a live call record for the first call. Steps 28 through 32 are for releasing the first call after the second call is established.

Figure 7A:
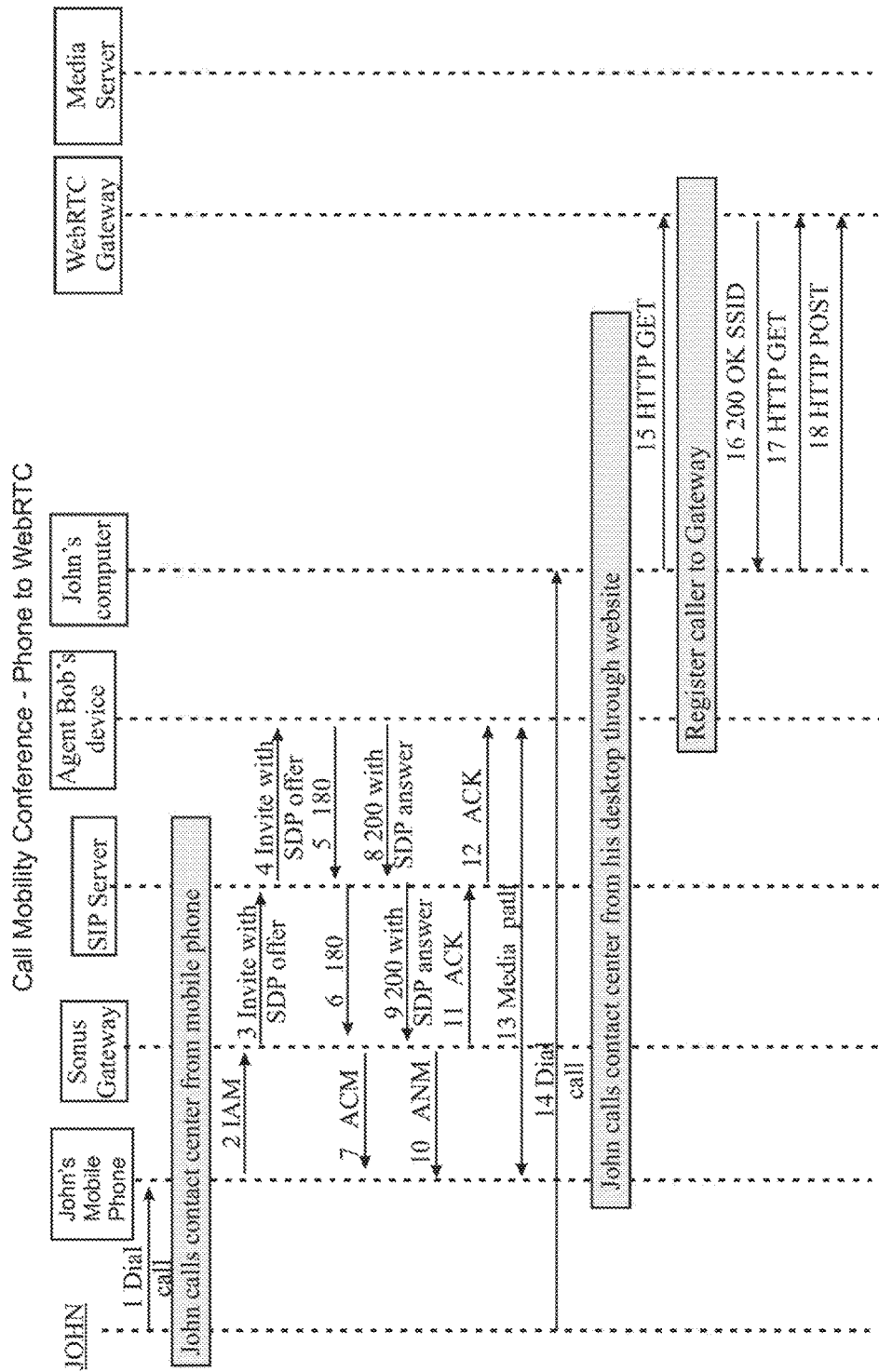
FIGS. 7a, 7b and 7c illustrate call mobility in yet another embodiment of the invention.
Figure 7B:
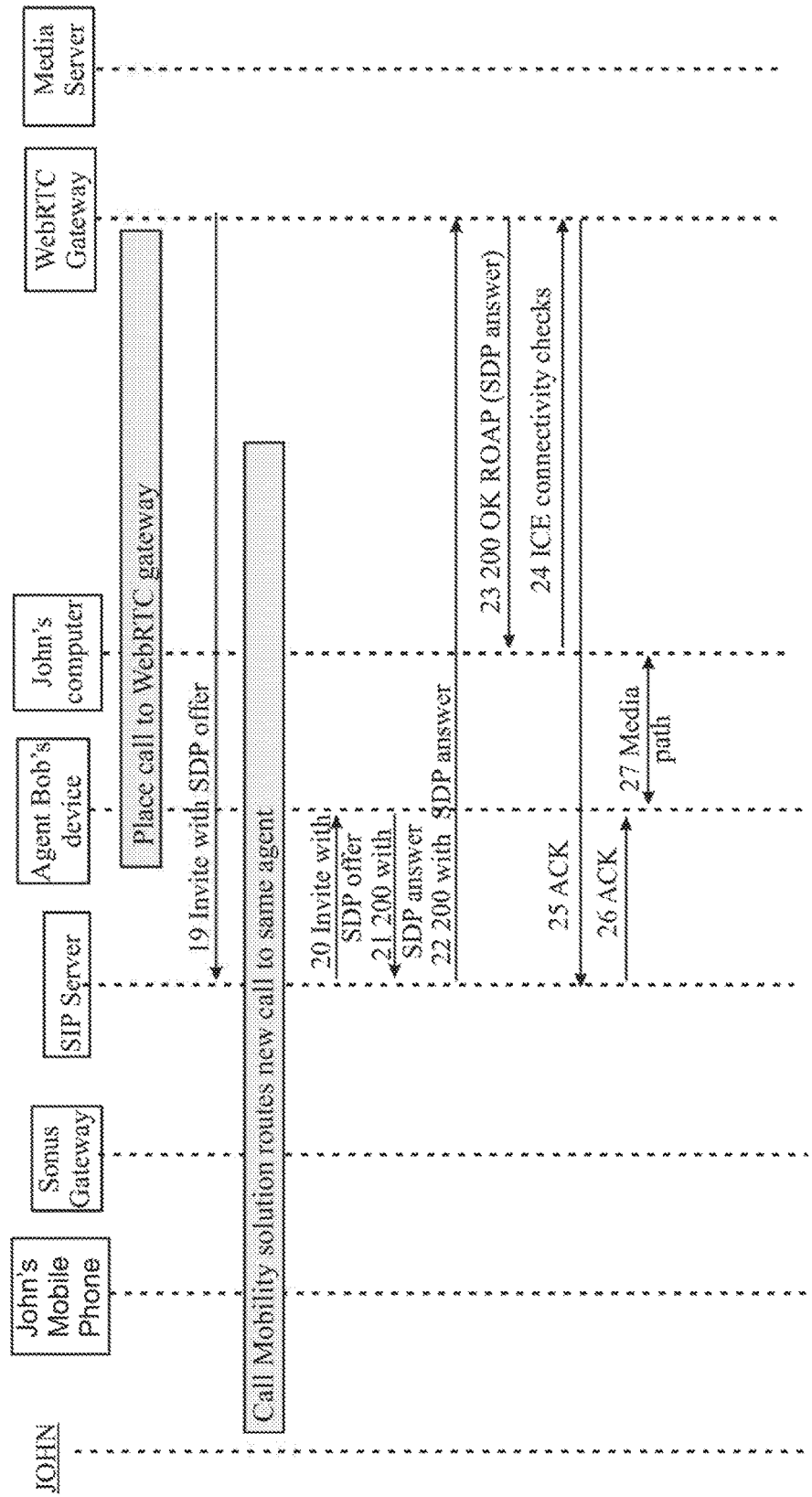
Figure 7C:
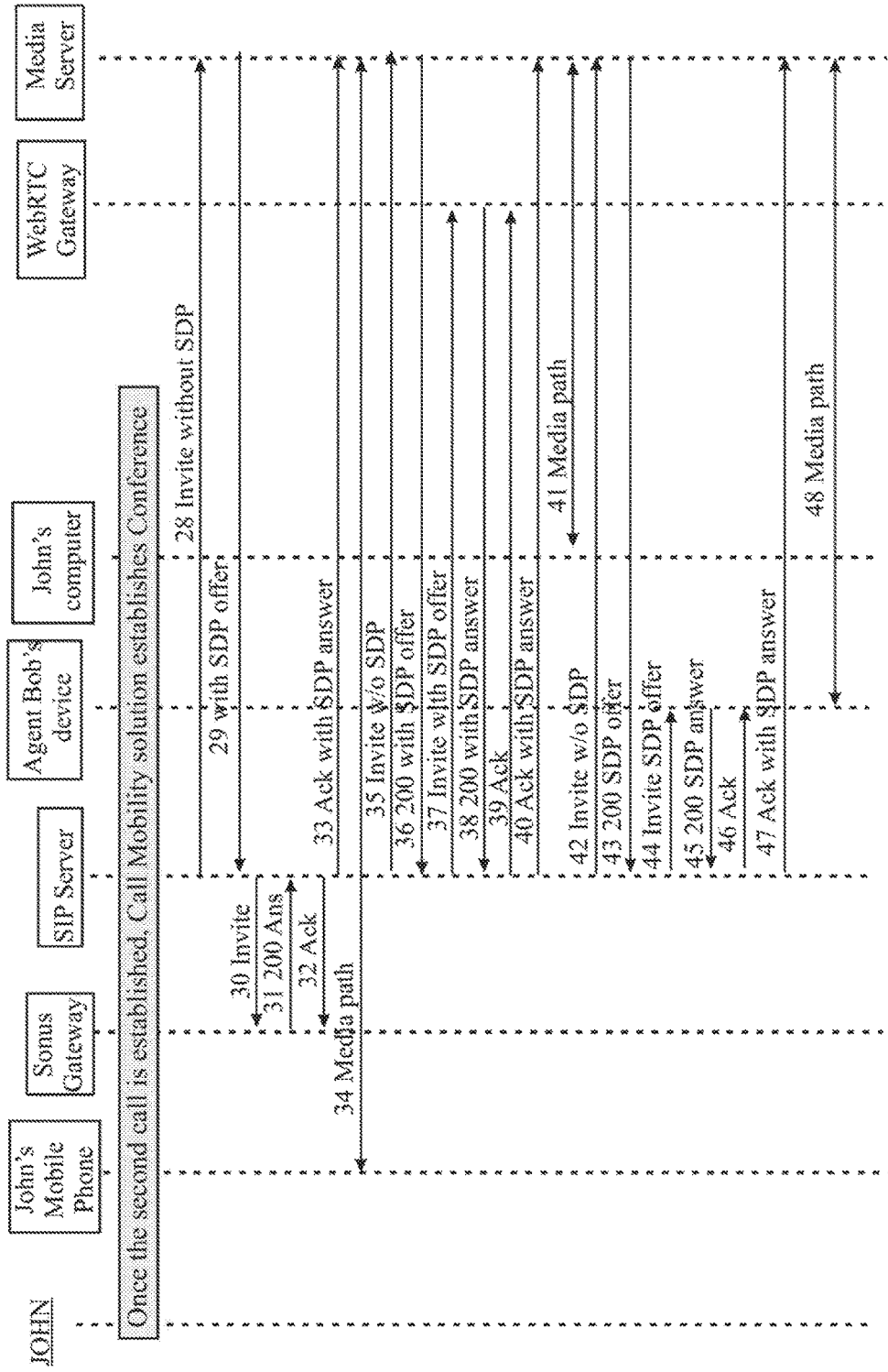

FIGS. 7a, 7b and 7c illustrate a circumstance of a first call from a mobile phone, a second call through desktop computer and WebRTC, wherein the two calls, after the second call is established to the same agent as the first call, the two calls are conferenced, so the one agent Bob is conferenced with caller John through two of John's communication appliances.

FIGS. 7a and 7b repeat FIGS. 6a and 6b up to the point of the second call being routed to the same agent as the first call. Beginning with step 28 on FIG. 7c, however, the process is different. Steps 28 through 48 in FIG. 7c show the steps for establishing the conference.

In an alternative embodiment of the invention, in the case of call mobility wherein the caller's two devices are capable of executing a special application, installed and executable on the devices, a swipe or tapping operation may be used to execute a call mobility transfer or call mobility conference. The first call is connected to the agent through the application. It is still necessary, of course that the contact center be implemented with the call mobility solution wherein a live call record is created and stored for each live call, to be deleted when each live call is terminated.

Upon the user deciding to move the call to the second device, the swipe or tap from the first device communicates with the application running on the second device. The passed information causes the second device to call the contact center, and may also pass on the necessary user ID with which the contact center solution may discover the live call record and determine to connect the same call to the same agent. In addition, the information passed, due to a variation by the user, may also determine whether the first call is to be replaced, or the two calls are to be conferenced.

In a further embodiment of the same invention, in some circumstances a second call might be established at the urging of a caller engaged in a live call with an agent, by the agent triggering an outbound call to a second device belonging to the caller. If this were the sole ability for call mobility for a particular call center, the fact of establishing live call records for incoming calls, might not be necessary, but there would be functionality in the agent's desktop to trigger the placement of the second call, and the destination for the second call. There is still a need with the agent's desktop functionality to provide to the contact center solution the agent's destination, so the second call, once completed from the contact center, may be connected back to the agent, which is the function of the live call record in other versions of the call mobility solution.

In one embodiment, each of the various servers, controllers, switches, gateways, engines, and/or modules (collectively referred to as servers) in the afore-described figures are implemented via hardware or firmware (e.g. ASIC) as will be appreciated by a person of skill in the art.

In one embodiment, each of the various servers, controllers, switches, gateways, engines, and/or modules (collectively referred to as servers) in the afore-described figures is a process or thread, running on one or more processors, in one or more computing devices 1500 (e.g., FIG. 8a, FIG. 8b), executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that a computing device may be implemented via firmware (e.g. an application-specific integrated circuit), hardware, or a combination of software, firmware, and hardware. A person of skill in the art should also recognize that the functionality of various computing devices may be combined or integrated into a single computing device, or the functionality of a particular computing device may be distributed across one or more other computing devices without departing from the scope of the exemplary embodiments of the present invention. A server may be a software module, which may also simply be referred to as a module. The set of modules in the contact center may include servers, and other modules.

The various servers may be located on a computing device on-site at the same physical location as the agents of the contact center or may be located off-site (or in the cloud) in a geographically different location, e.g., in a remote data center, connected to the contact center via a network such as the Internet. In addition, some of the servers may be located in a computing device on-site at the contact center while others may be located in a computing device off-site, or servers providing redundant functionality may be provided both via on-site and off-site computing devices to provide greater fault tolerance. In some embodiments of the present invention, functionality provided by servers located on computing devices off-site may be accessed and provided over a virtual private network (VPN) as if such servers were on-site, or the functionality may be provided using a software as a service (SaaS) to provide functionality over the internet using various protocols, such as by exchanging data using encoded in extensible markup language (XML) or JavaScript Object notation (JSON).

Figure 8A:
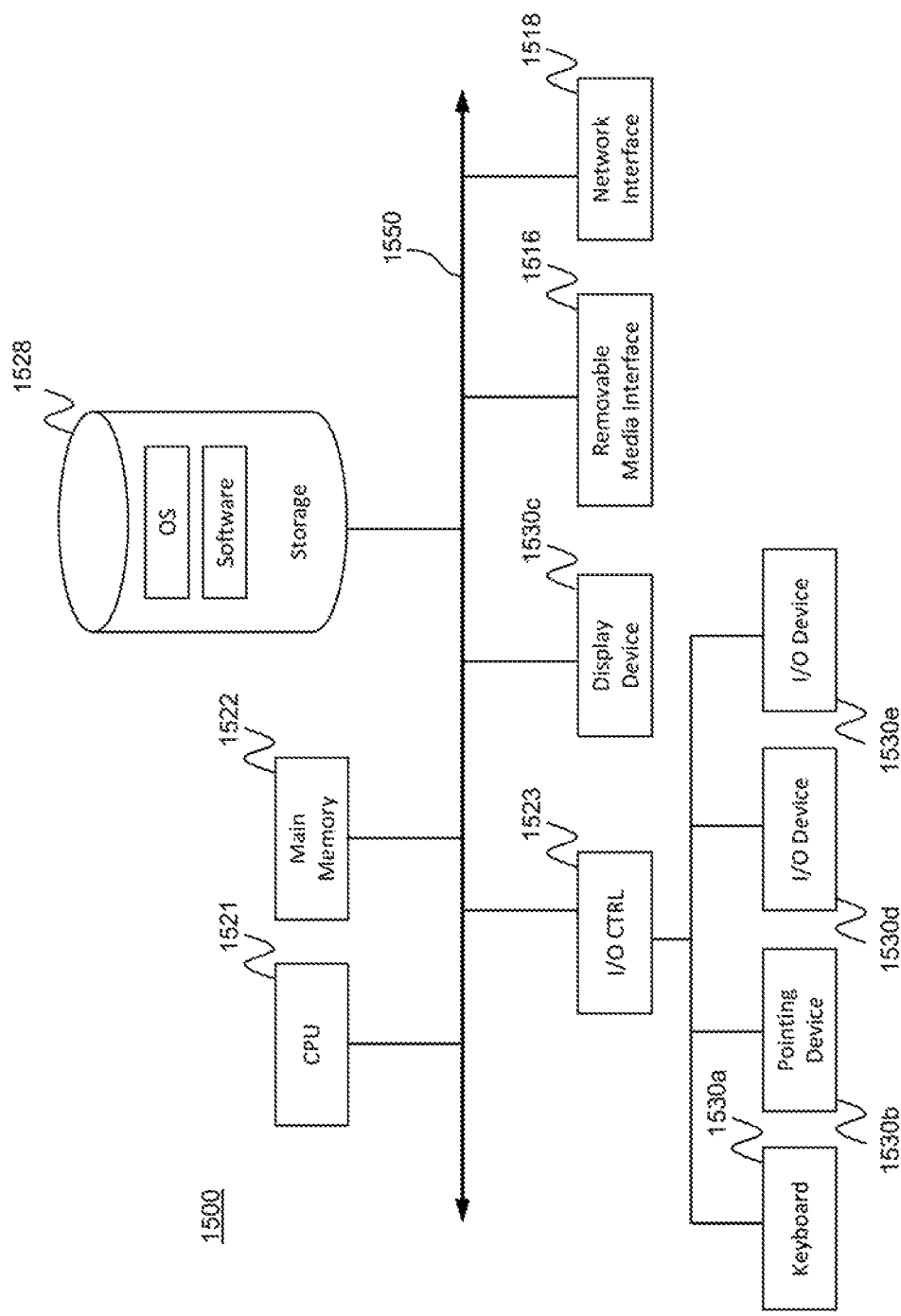
FIG. 8a is a block diagram of a computing device according to an embodiment of the present invention.
Figure 8B:
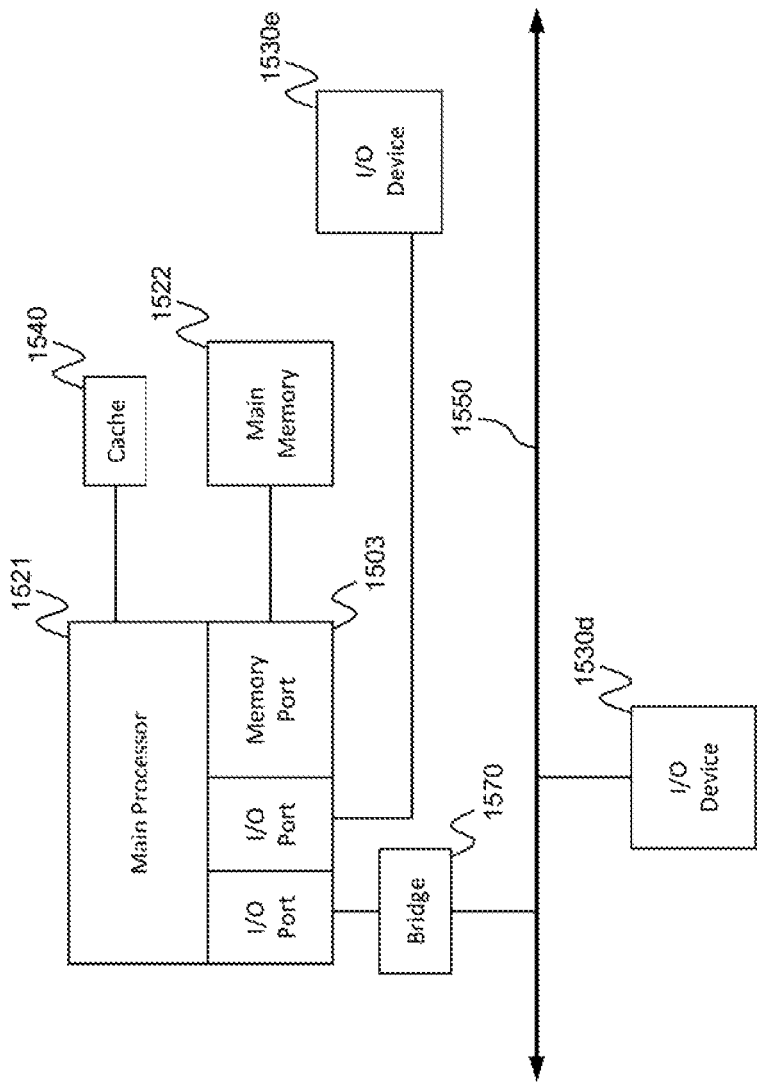
FIG. 8b is a block diagram of a computing device according to an embodiment of the present invention.

FIG. 8a and FIG. 8b depict block diagrams of a computing device 1500 as may be employed in exemplary embodiments of the present invention. Each computing device 1500 includes a central processing unit 1521 and a main memory unit 1522. As shown in FIG. 8a, the computing device 1500 may also include a storage device 1528, a removable media interface 1516, a network interface 1518, an input/output (I/O) controller 1523, one or more display devices 1530c, a keyboard 1530a and a pointing device 1530b, such as a mouse. The storage device 1528 may include, without limitation, storage for an operating system and software. As shown in FIG. 8b, each computing device 1500 may also include additional optional elements, such as a memory port 1503, a bridge 1570, one or more additional input/output devices 1530d, 1530e and a cache memory 1540 in communication with the central processing unit 1521. The input/output devices 1530a, 1530b, 1530d, and 1530e may collectively be referred to herein using reference numeral 1530.

The central processing unit 1521 is any logic circuitry that responds to and processes instructions fetched from the main memory unit 1522. It may be implemented, for example, in an integrated circuit, in the form of a microprocessor, microcontroller, or graphics processing unit (GPU), or in a field-programmable gate array (FPGA) or application-specific integrated circuit (ASIC). The main memory unit 1522 may be one or more memory chips capable of storing data and allowing any storage location to be directly accessed by the central processing unit 1521. As shown in FIG. 8a, the central processing unit 1521 communicates with the main memory 1522 via a system bus 1550. As shown in FIG. 8b, the central processing unit 1521 may also communicate directly with the main memory 1522 via a memory port 1503.

FIG. 8b depicts an embodiment in which the central processing unit 1521 communicates directly with cache memory 1540 via a secondary bus, sometimes referred to as a backside bus. In other embodiments, the central processing unit 1521 communicates with the cache memory 1540 using the system bus 1550. The cache memory 1540 typically has a faster response time than main memory 1522. As shown in FIG. 8a, the central processing unit 1521 communicates with various I/O devices 1530 via the local system bus 1550. Various buses may be used as the local system bus 1550, including a Video Electronics Standards Association (VESA) Local bus (VLB), an Industry Standard Architecture (ISA) bus, an Extended Industry Standard Architecture (EISA) bus, a MicroChannel Architecture (MCA) bus, a Peripheral Component Interconnect (PCI) bus, a PCI Extended (PCI-X) bus, a PCI-Express bus, or a NuBus. For embodiments in which an I/O device is a display device 1530c, the central processing unit 1521 may communicate with the display device 1530c through an Advanced Graphics Port (AGP). FIG. 8b depicts an embodiment of a computer 1500 in which the central processing unit 1521 communicates directly with I/O device 1530e. FIG. 8b also depicts an embodiment in which local busses and direct communication are mixed: the central processing unit 1521 communicates with I/O device 1530d using a local system bus 1550 while communicating with I/O device 1530e directly.

A wide variety of I/O devices 1530 may be present in the computing device 1500. Input devices include one or more keyboards 1530a, mice, trackpads, trackballs, microphones, and drawing tablets. Output devices include video display devices 1530c, speakers, and printers. An I/O controller 1523, as shown in FIG. 8a, may control the I/O devices. The I/O controller may control one or more I/O devices such as a keyboard 1530a and a pointing device 1530b, e.g., a mouse or optical pen.

Referring again to FIG. 8a, the computing device 1500 may support one or more removable media interfaces 1516, such as a floppy disk drive, a CD-ROM drive, a DVD-ROM drive, tape drives of various formats, a USB port, a Secure Digital or COMPACT FLASH™ memory card port, or any other device suitable for reading data from read-only media, or for reading data from, or writing data to, read-write media. An I/O device 1530 may be a bridge between the system bus 1550 and a removable media interface 1516.

The removable media interface 1516 may for example be used for installing software and programs. The computing device 1500 may further comprise a storage device 1528, such as one or more hard disk drives or hard disk drive arrays, for storing an operating system and other related software, and for storing application software programs. Optionally, a removable media interface 1516 may also be used as the storage device. For example, the operating system and the software may be run from a bootable medium, for example, a bootable CD.

In some embodiments, the computing device 1500 may comprise or be connected to multiple display devices 1530*c*, which each may be of the same or different type and/or form. As such, any of the I/O devices 1530 and/or the I/O controller 1523 may comprise any type and/or form of suitable hardware, software, or combination of hardware and software to support, enable or provide for the connection to, and use of, multiple display devices 1530*c* by the computing device 1500. For example, the computing device 1500 may include any type and/or form of video adapter, video card, driver, and/or library to interface, communicate, connect or otherwise use the display devices 1530*c*. In one embodiment, a video adapter may comprise multiple connectors to interface to multiple display devices 1530*c*. In other embodiments, the computing device 1500 may include multiple video adapters, with each video adapter connected to one or more of the display devices 1530*c*. In some embodiments, any portion of the operating system of the computing device 1500 may be configured for using multiple display devices 1530*c*. In other embodiments, one or more of the display devices 1530*c* may be provided by one or more other computing devices, connected, for example, to the computing device 1500 via a network. These embodiments may include any type of software designed and constructed to use the display device of another computing device as a second display device 1530*c* for the computing device 1500. One of ordinary skill in the art will recognize and appreciate the various ways and embodiments that a computing device 1500 may be configured to have multiple display devices 1530*c*.

A computing device 1500 of the sort depicted in FIG. 8*a* and FIG. 8*b* may operate under the control of an operating system, which controls scheduling of tasks and access to system resources. The computing device 1500 may be running any operating system, any embedded operating system, any real-time operating system, any open source operating system, any proprietary operating system, any operating systems for mobile computing devices, or any other operating system capable of running on the computing device and performing the operations described herein.

The computing device 1500 may be any workstation, desktop computer, laptop or notebook computer, server machine, handheld computer, mobile telephone or other portable telecommunication device, media playing device, gaming system, mobile computing device, or any other type and/or form of computing, telecommunications or media device that is capable of communication and that has sufficient processor power and memory capacity to perform the operations described herein. In some embodiments, the computing device 1500 may have different processors, operating systems, and input devices consistent with the device.

In other embodiments the computing device 1500 is a mobile device, such as a Java-enabled cellular telephone or personal digital assistant (PDA), a smart phone, a digital audio player, or a portable media player. In some embodiments, the computing device 1500 comprises a combination of devices, such as a mobile phone combined with a digital audio player or portable media player.

Figure 8C:
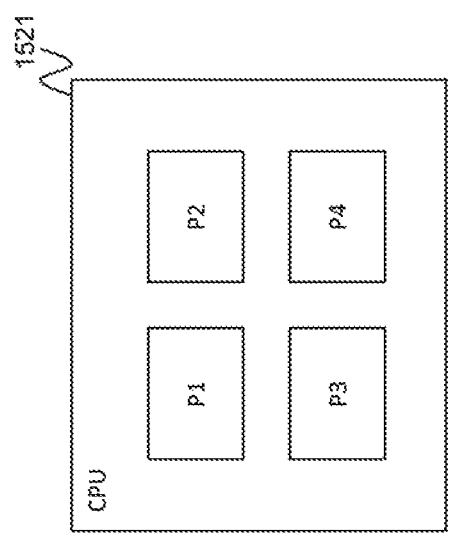
FIG. 8c is a block diagram of a computing device according to an embodiment of the present invention.
Figure 8D:
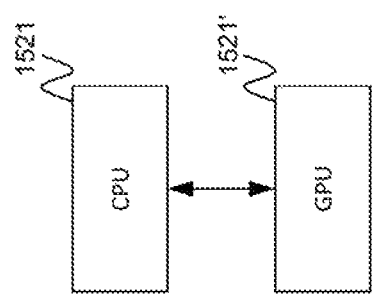
FIG. 8d is a block diagram of a computing device according to an embodiment of the present invention.

As shown in FIG. 8*c*, the central processing unit 1521 may comprise multiple processors P1, P2, P3, P4, and may provide functionality for simultaneous execution of instructions or for simultaneous execution of one instruction on more than one piece of data. In some embodiments, the computing device 1500 may comprise a parallel processor with one or more cores. In one of these embodiments, the computing device 1500 is a shared memory parallel device, with multiple processors and/or multiple processor cores, accessing all available memory as a single global address space. In another of these embodiments, the computing device 1500 is a distributed memory parallel device with multiple processors each accessing local memory only. In still another of these embodiments, the computing device 1500 has both some memory which is shared and some memory which may only be accessed by particular processors or subsets of processors. In still even another of these embodiments, the central processing unit 1521 comprises a multicore microprocessor, which combines two or more independent processors into a single package, e.g., into a single integrated circuit (IC). In one exemplary embodiment, depicted in FIG. 8*d*, the computing device 1500 includes at least one central processing unit 1521 and at least one graphics processing unit 1521'.

In some embodiments, a central processing unit 1521 provides single instruction, multiple data (SIMD) functionality, e.g., execution of a single instruction simultaneously on multiple pieces of data. In other embodiments, several processors in the central processing unit 1521 may provide functionality for execution of multiple instructions simultaneously on multiple pieces of data (MIMD). In still other embodiments, the central processing unit 1521 may use any combination of SIMD and MIMD cores in a single device.

Figure 8E:
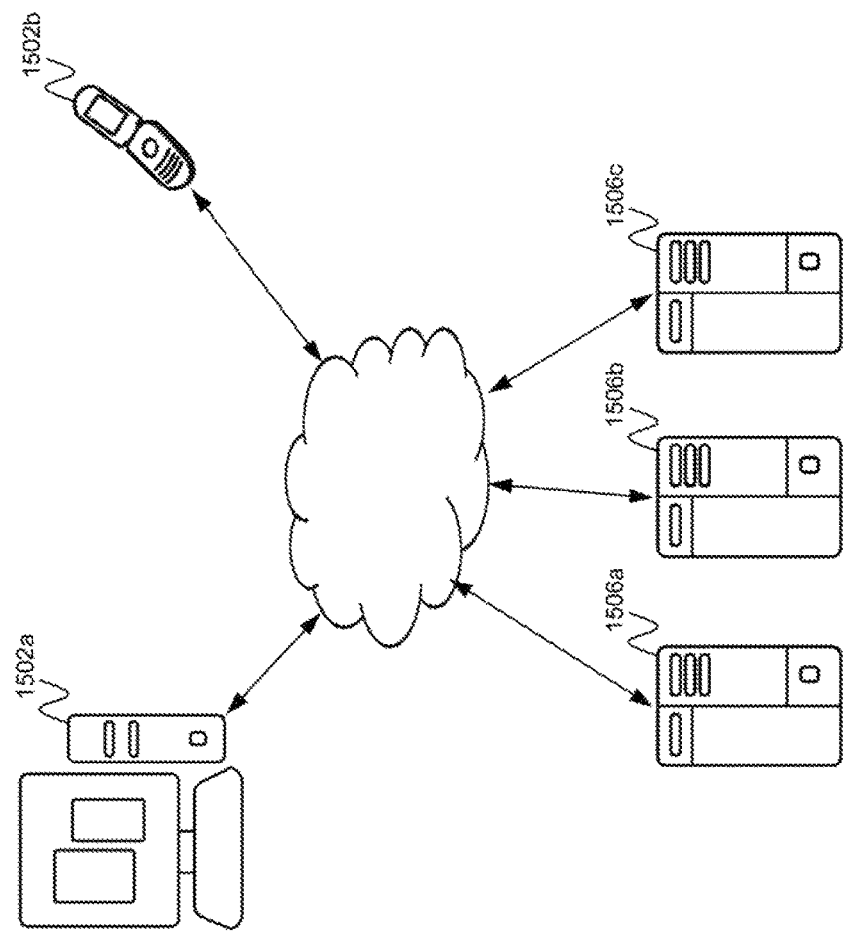
FIG. 8e is a block diagram of a network environment including several computing devices according to an embodiment of the present invention.

A computing device may be one of a plurality of machines connected by a network, or it may comprise a plurality of machines so connected. FIG. 8*e* shows an exemplary network environment. The network environment comprises one or more local machines 1502*a*, 1502*b* (also generally referred to as local machine(s) 1502, client(s) 1502, client node(s) 1502, client machine(s) 1502, client computer(s) 1502, client device(s) 1502, endpoint(s) 1502, or endpoint node(s) 1502) in communication with one or more remote machines 1506*a*, 1506*b*, 1506*c* (also generally referred to as server machine(s) 1506 or remote machine(s) 1506) via one or more networks 1504. In some embodiments, a local machine 1502 has the capacity to function as both a client node seeking access to resources provided by a server machine and as a server machine providing access to hosted resources for other clients 1502*a*, 1502*b*. Although only two clients 1502 and three server machines 1506 are illustrated in FIG. 8*e*, there may, in general, be an arbitrary number of each. The network 1504 may be a local-area network (LAN), e.g., a private network such as a company Intranet, a metropolitan area network (MAN), or a wide area network (WAN), such as the Internet, or another public network, or a combination thereof.

The computing device 1500 may include a network interface 1518 to interface to the network 1504 through a variety of connections including, but not limited to, standard telephone lines, local-area network (LAN), or wide area network (WAN) links, broadband connections, wireless connections, or a combination of any or all of the above. Connections may be established using a variety of communication protocols. In one embodiment, the computing device 1500 communicates with other computing devices 1500 via any type and/or form of gateway or tunneling protocol such as Secure Socket Layer (SSL) or Transport Layer Security (TLS). The network interface 1518 may comprise a built-in network adapter, such as a network interface card, suitable for interfacing the computing device 1500 to any type of network capable of communication and performing the operations described herein. An I/O device 1530 may be a bridge between the system bus 1550 and an external communication bus.

According to one embodiment, the network environment of FIG. 8e may be a virtual network environment where the various components of the network are virtualized. For example, the various machines 1502 may be virtual machines implemented as a software-based computer running on a physical machine. The virtual machines may share the same operating system. In other embodiments, different operating system may be run on each virtual machine instance. According to one embodiment, a "hypervisor" type of virtualization is implemented where multiple virtual machines run on the same host physical machine, each acting as if it has its own dedicated box. Of course, the virtual machines may also run on different host physical machines.

Other types of virtualization is also contemplated, such as, for example, the network (e.g. via Software Defined Networking (SDN)). Functions, such as functions of the session border controller and other types of functions, may also be virtualized, such as, for example, via Network Functions Virtualization (NFV).

In addition, the various processes described herein are, in one embodiment, software routines executed by The process may be described in terms of a software routine executed by the processor in the server 100 based on instructions stored in the server's memory. The instructions may also be stored in other non-transient computer readable media such as, for example, a CD-ROM, flash drive, or the like. A person of skill in the art should also recognize that the routine may be executed via hardware, firmware (e.g. via an ASIC), or in any combination of software, firmware, and/or hardware. Furthermore, the sequence of steps of the process is not fixed, but can be altered into any desired sequence as recognized by a person of skill in the art.

The skilled person with realize that the embodiments described in enabling detail above are exemplary, and are detailed as compatible with specific architecture and SW residence, which may vary considerably in different embodiments of the invention not described in complete detail herein. There are, as is well known, many variations in devices, connectivity, call placement procedure, call center architecture and software placement, function and execution in which the call mobility solution enabled herein may be practiced. The scope of the invention is therefore limited only by the claims which follow.

The invention claimed is:

1. A method, comprising:
    identifying by a processor associated with a call center, a first telephony call from a caller using a first telephony-enabled device;
    transmitting, by the processor, a signal for routing the first telephony call to an agent device accessible to an agent in the call center, wherein in response to routing the first telephony call, a first voice communication session is established between the first telephony-enabled device and the agent device;
    creating and storing, by the processor, in a data repository associated with the call center, a live call record associating an identifier associated with the caller or a device of the caller, with the agent;
    identifying, by the processor, while the first telephony call is active, a second telephony call from the caller using a second telephony-enabled device, wherein at least a portion of the identifier is provided for the second telephony call;
    querying, by the processor, the data repository and discovering the live call record based on the portion of the identifier provided for the second telephony call;
    identifying, by the processor, based on the live call record, the agent handling the first telephony call;
    transmitting, by the processor, a signal for routing the second telephony call to the identified agent;
    routing, by a router coupled to the processor, the second telephony call to the identified agent prior to terminating the first telephony call with the agent, wherein in response to routing the second telephony call, a second voice communication session is established between the second telephony-enabled device and the agent device, wherein the second voice communication session is established concurrently with the first voice communication session; and
    transmitting, by the processor, a signal for terminating the first telephony call while leaving the live call record in place.

2. The method of claim 1 further comprising deleting by the processor the live call record from the data repository in response to detecting termination of the second telephony call.

3. The method of claim 1 wherein the identifier associated with the caller is a telephony number.

4. The method of claim 1 wherein the data repository stores a user profile for individual ones of callers, and the processor queries the user profile for a caller ID in response to identifying the first telephony call, wherein the live call record is stored in association with the caller ID.

5. The method of claim 1 further comprising determining, in response to discovering the live call record, whether to replace the first telephony call with the second telephony call, or conference the second telephony call with the first telephony call.

6. The method of claim 5 wherein the determination of conference or replacement is made by interactive voice response interaction with the caller.

7. The method of claim 5 wherein the determination of conference or replacement is made according to data associated with the second telephony call.

8. The method of claim 7 wherein the data comprises a toll-free number dialed by the caller for the second telephony call.

9. The method of claim 5 further comprising transmitting, by the processor, a signal for terminating the first telephony call or conferencing the first telephony call according to the determination.

10. The method of claim 1 further comprising an application executing on both the first and the second telephony-enabled devices, the application being configured to initiate the second telephony call from the second telephony-enabled device in response to receipt of input from the first telephony-enabled device.

11. An apparatus, comprising:
    a data repository;
    a routing device;
    a processor coupled to the data repository and the routing device; and
    a memory, wherein the memory stores instructions that, when executed by the processor, cause the processor to:
        identify a first telephony call from a caller using a first telephony-enabled device;
        transmit a signal for routing the first telephony call to an agent device accessible to an agent in a call center, wherein in response to routing the first telephony call, a first voice communication session is adapted to be established between the first telephony-enabled device and the agent device;

create and store, in the data repository, a live call record associating an identifier associated with the caller or a device of the caller, with the agent;

identify, while the first telephony call is active, a second telephony call from the caller using a second telephony-enabled device, wherein at least a portion of the identifier is provided for the second telephony call;

query the data repository and discover the live call record based on the portion of the identifier provided for the second telephony call;

identify, based on the live call record, the agent handling the first telephony call;

transmit a signal for routing the second telephony call to the identified agent; and transmit a signal for terminating the first telephony call while leaving the live call record in place, wherein the routing device is configured to route the second telephony call to the identified agent prior to terminating the first telephony call with the agent, wherein in response to routing the second telephony call, a second voice communication session is configured to be established between the second telephony-enabled device and the agent device, wherein the second voice communication session is adapted to be established concurrently with the first voice communication session.

12. The apparatus of claim 11 wherein the memory further includes instructions that, when executed by the processor, cause the processor to delete the call record in response to detecting termination of the second telephony call.

13. The apparatus of claim 11 wherein the identifier associated with the caller is a telephony number.

14. The apparatus of claim 11 wherein the data repository stores a user profile for individual ones of callers, wherein the instructions further cause the processor to query the user profile for a caller ID in response to identifying the first telephony call, wherein the live call record is stored in association with the caller ID.

15. The apparatus of claim 11 wherein the instructions further cause the processor to, in response to discovering the live call record, determine whether to replace the first telephony call with the second telephony call, or conference the second telephony call with the first telephony call.

16. The apparatus of claim 15 wherein the determination of conference or replacement is made by interactive voice response interaction with the caller.

17. The apparatus of claim 15 wherein the determination of conference or replacement is made according to data associated with the second telephony call.

18. The apparatus of claim 17 wherein the data comprises a toll-free number dialed by the caller for the second telephony call.

19. The apparatus of claim 15 wherein the instructions further cause the processor to transmit a signal for terminating the first telephony call or conferencing the first telephony call with the second telephony call according to the determination.

20. A method for managing telephony calls for a customer contact center, the method comprising:

identifying, by a processor, a first telephony call from a first caller made via a first telephony-enabled device;

transmitting, by the processor, a signal for connecting the first telephony call to an agent device in the customer contact center, wherein in response to connecting the first telephony call, a first voice communication session is established between the first telephony-enabled device and the agent device;

creating and storing, by the processor, a call record for the first telephony call, wherein the call record associates an identifier associated with the caller or a device of the caller, with the agent to whom the first telephony call is connected;

identifying, by the processor, while the first telephony call is active, a second telephony call from the caller via a second telephony enabled device, wherein at least a portion of the identifier is provided for the second telephony call;

retrieving, by the processor, the call record in response to identifying the second telephony call, wherein the identifying of the call record is based on the portion of the identifier provided for the second telephony call;

identifying, by the processor, based on the call record, the agent handling the first telephony call;

transmitting, by the processor, a signal for routing the second telephony call to the identified agent;

routing, by a router coupled to the processor, in response to data retrieved from the call record, the second telephony call to the identified agent prior to terminating the first telephony call with the agent, wherein in response to routing the second telephony call, a second voice communication session is established between the second telephony-enabled device and the agent device, wherein the second voice communication session is established concurrently with the first voice communication session;

transmitting, by the processor, a signal for terminating the first telephony call without deleting the call record; and storing, by the processor, data related to the second telephony call, in the call record.

* * * * *